US005093726A

United States Patent [19]

Chun

[11] Patent Number: 5,093,726

[45] Date of Patent: Mar. 3, 1992

[54] MULTI-TYPE MULTI-CHANNEL SELECTOR

[75] Inventor: Yu J. Chun, Seoul, Rep. of Korea

[73] Assignee: Samsung Electronics Co., Ltd., Rep. of Korea

[21] Appl. No.: 662,986

[22] Filed: Feb. 28, 1991

Related U.S. Application Data

[63] Continuation of Ser. No. 368,711, Jun. 20, 1989, abandoned.

[30] Foreign Application Priority Data

Jun. 20, 1988 [KR] Rep. of Korea ........................ 88-9410

[51] Int. Cl.[5] ............................................ H04N 5/272

[52] U.S. Cl. ................................ 358/183; 358/194.1; 359/146

[58] Field of Search ................. 358/181, 182, 183, 22, 358/185, 194.1; 455/603

[56] References Cited

U.S. PATENT DOCUMENTS 4,172,264 10/1979 Taylor ................................ 358/185
4,729,027 3/1988 Hakamada ............................ 358/22
4,751,579 6/1988 Okunishi ............................ 358/183
4,782,384 11/1988 Tucker ................................ 358/22
4,782,392 11/1988 Haycock ............................ 358/183
4,821,102 4/1989 Ichikawa ............................ 358/183
4,914,516 4/1990 Duffield ............................ 358/183

OTHER PUBLICATIONS

Toshiba, Model 30ID1.

*Primary Examiner*—Tommy P. Chin
*Attorney, Agent, or Firm*—Sterne, Kessler, Goldstein & Fox

[57] ABSTRACT

A multi-channel picture-in-picture television display system with a multi-channel method for controlling the selection of multiple channels for display within sub-screens of the main viewing screen is disclosed. Selection of multi-channel viewing is accomplished via remote control operation. Selection of still screen and moving screens is done by updating skip memory using an add key. Controlling a strobe signal of the system microcomputer generates a channel up/down command of a particular sub-screen during multi-channel operation.

3 Claims, 15 Drawing Sheets

*Fig. 2a*
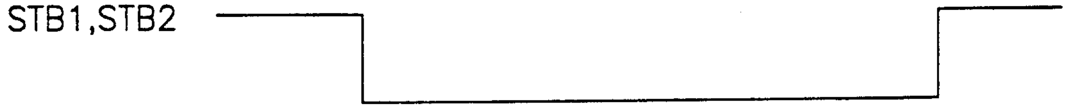
*Fig. 2b*
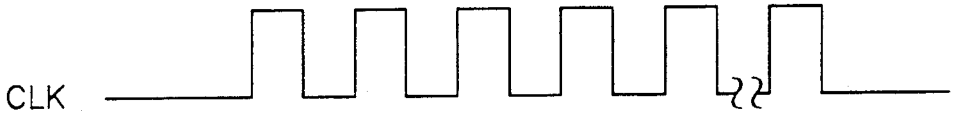
*Fig. 2c*
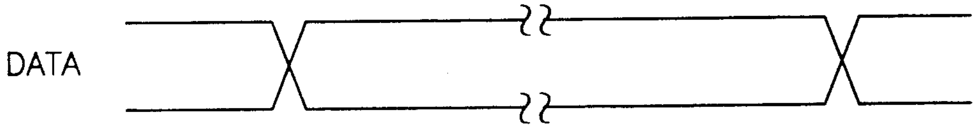
*Fig. 3*
| SERIAL DATA | FUNCTION |
|---|---|
| 00 00 00 10 | ROTATE |
| 00 10 11 11 | STROBE |
| ⋮ | ⋮ |

*Fig. 6B*
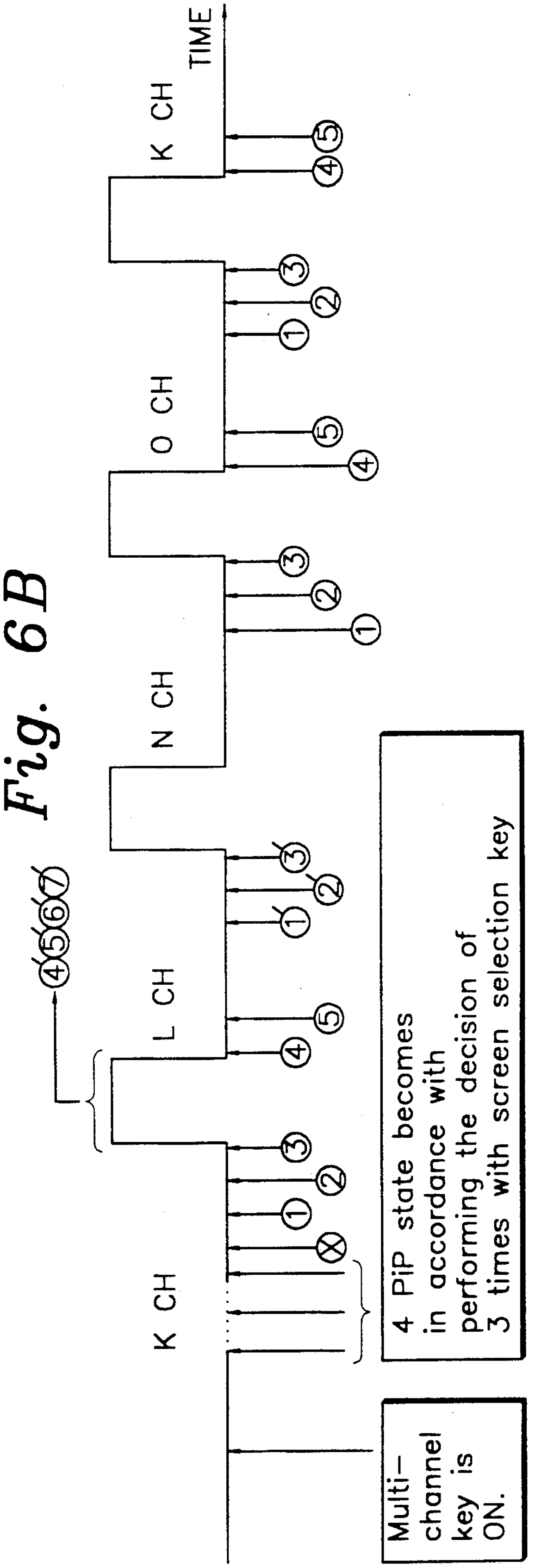
*Fig. 6C*
| | |
|---|---|
| position 1 | K CH |
| " 2 | L CH |
| " 3 | NON ADDED CH |
| " 4 | M CH |
| " 5 | N CH |
| " . | O CH |
| " . | . |
| " . | . |
| " . | . |
32 positions
*Fig. 6D*
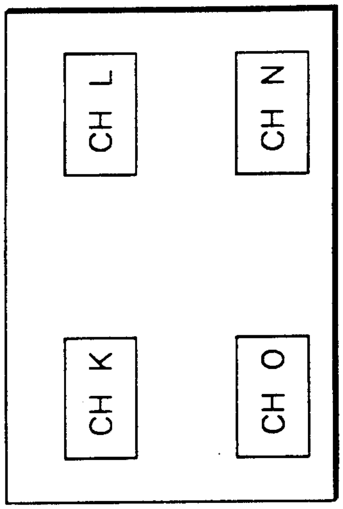

| position | | skip memory |
|---|---|---|
| | 1 | K |
| " | 2 | L |
| " | 3 | M |
| " | 4 | NON ADDED CH |
| " | 5 | N |
| " | 6 | NON ADDED CH |
| " | 7 | O |
| " | 8 | P |
| " | 9 | Q |
| " | 10 | R |
| " | 32 | |

*Fig. 8D*
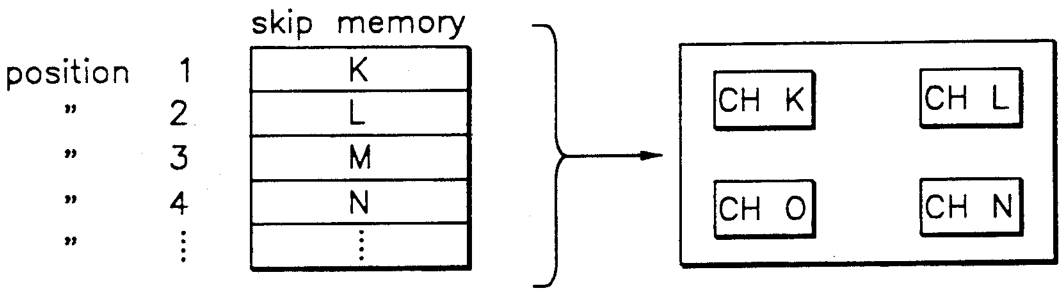
*Fig. 9* (A – 1)
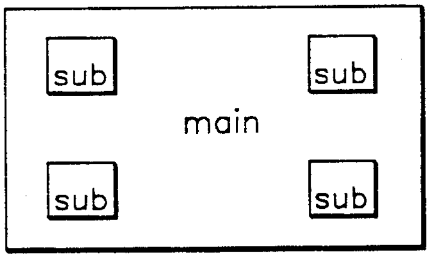
*Fig. 9* (A – 2)
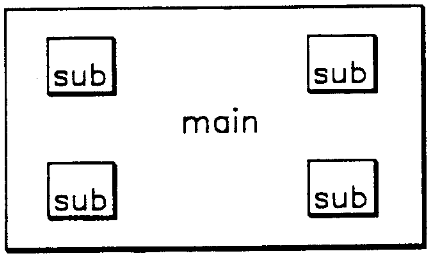
*Fig. 9* (B – 1)
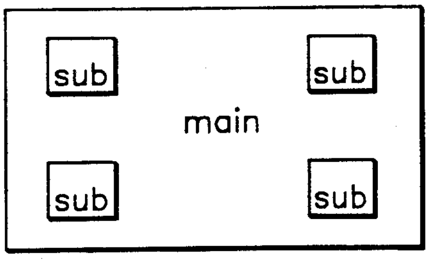
*Fig. 9* (B – 2)
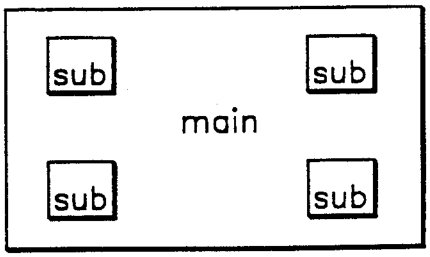

(A−1)

| | Q6 | | Q7 |
|---|---|---|---|
| PB | X | Y | L |
| | L | H | |
| NON PB | X | Y | H |
| | L | H | |

(B−1)

| | Q6 | | Q7 | |
|---|---|---|---|---|
| PB | L | | X | Y |
| | | | L | H |
| NON PB | X | Y | X | Y |
| | L | H | L | H |

MULTI-TYPE MULTI-CHANNEL SELECTOR

This application is a continuation of application Ser. No. 07/368,711, filed June 20, 1989. Now abandoned.

BACKGROUND OF THE INVENTION

This invention relates to the control and display of simultaneous plural video images on standard television equipment.

In particular, it relates to methods and apparatus used to select different television channels and display them simultaneously on the same television screen, using an existing picture in picture (PIP) function.

Existing multi-channel systems do not require such a selection function, because only a single sub-screen is displayed in a main screen.

SUMMARY OF THE INVENTION

According to this invention, a user may select for simultaneous display on the same television screen, a main screen and plural sub-screens.

The sub-screens are displayed spatially distinct so that all sub-screens are viewable simultaneously. The main screen is also concurrently viewable, excepting those display areas where sub-screens are overlaid on the main screen.

BRIEF DESCRIPTION OF THE DRAWINGS

FIGS. 2A, 2B, and 2C are waveforms is showing the operation of the Microcomputer;

FIG. 3 is a diagram showing the function of serial data in the microcomputer;

FIG. 6-(C) is a representation of skip memory showing the position in the memory of various television channels.

FIGS. 6-(D) and (E) are status diagrams of multichannel displays which are displayed in a main screen;

FIGS. 9-(A-1), (A-2), (B-1) and (B-2) are the display charts of are the display charts of the main screen and sub-screen of tuner 1 and tuner 2;

DETAILED DESCRIPTION OF THE PREFERRED EMBODIMENT

This invention is related to the apparatus described in Ser. No. 07/365,573 filed on June 14, 1989 (the '573 application) the substance of which is set forth in full below.

The '573 application relates to the control and display of simultaneous plural video images on standard television equipment. It relates to a menu-driven multi-channel system in which a user easily selects channels by executing page up and page down commands.

It utilizes the picture-in-picture (PIP) function of existing and well-known television and video cassette recorder (VCR) technology. However, current technology displays only one sub-screen video image in the corner of a main screen. It relates to the display of more than one sub-screen in a main screen.

The '573 application provides a menu-type multichannel video display system with page up/down mode comprising:

- a skip memory,
- a television tuner circuit,
- a VCR signal processing circuit,
- a switching circuit,
- a PIP processing circuit
- an input selector for the main screen,
- an output selector for the sub-screen,
- a microcomputer,
- an on-screen display integrated circuit (OSDIC),
- a mixer,
- an audio circuit,
- two tuners, and
- a multiplexer.

Television channels are stored in the skip memory and assigned to a particular sub-screen. When the main screen is in PIP mode, and a multi-channel signal is received (from a user activating the multi-channel capability), the channels stored in skip memory are displayed in menu format, and can be selected by a novel page up/page down feature. This allows a user to easily and conveniently select the channel of his choice.

Multi-channel mode is defined as n PIP sub-screens within a main screen, where each screen data of said PIP sub-screens is fetched from skip memory and displayed on the n PIP sub-screens at the same time.

Multi-channel mode can work on the PIP system with either tuner 1 or tuner 2. In multi-channel mode, the procedure of PIP control is as follows: when a multi-channel signal is received (as when a multi-channel key is actuated by a user), the multi-channel mode activates, and the skip memory is scanned.

Figure 6A:
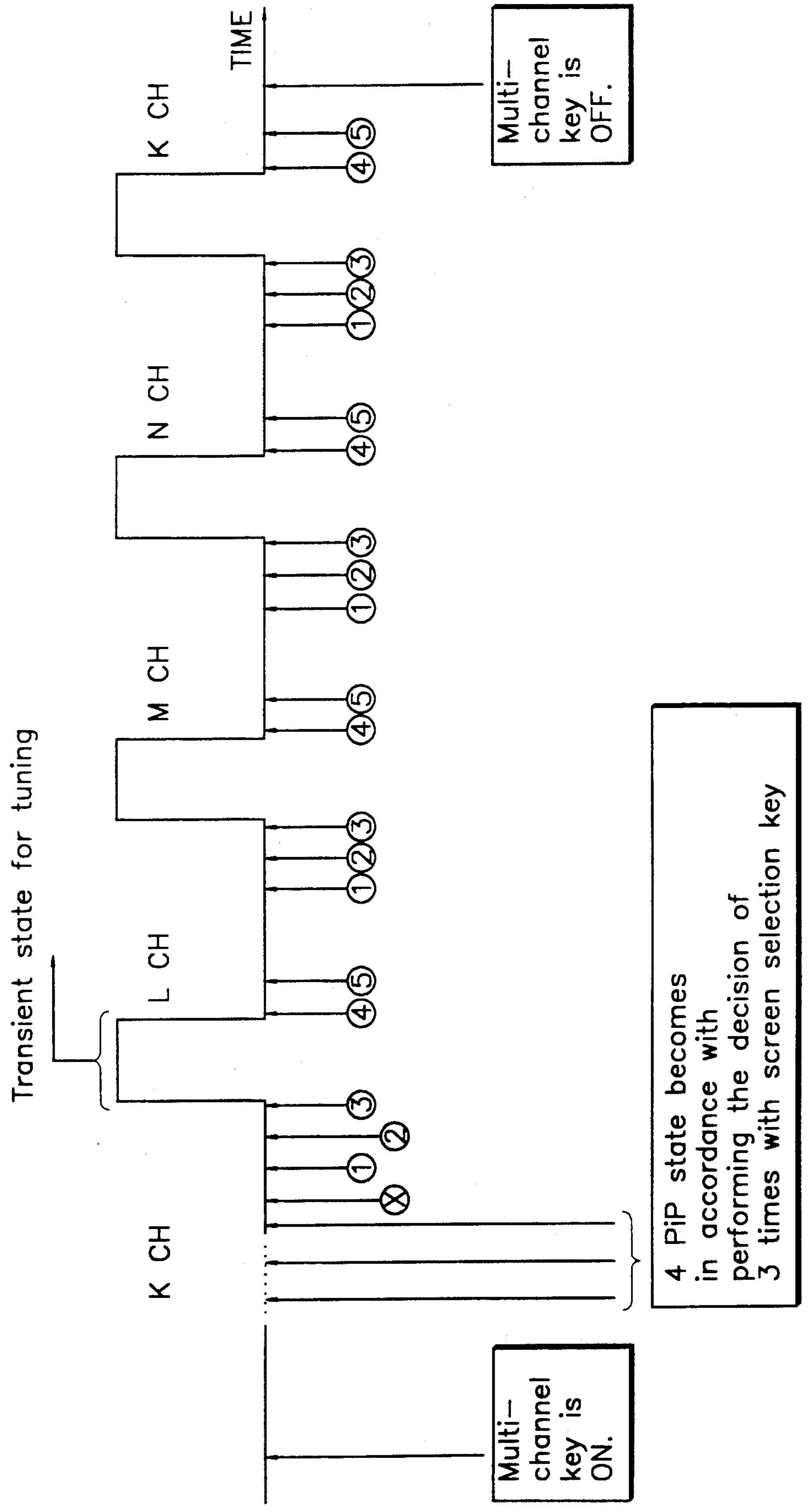
FIGS. 6-(A) and (B) are the waveforms for PIP and tuning for the exemplary embodiment of the present invention.

If there is a synchronized signal on a channel during the multi-channel mode, the channel becomes an effective channel as shown in timing diagram FIG. 6(A):

In FIG. 6(A), a multi-channel signal is received from a user. Following this signal, the user initiates a command to rotate the sub-screen images (shown as $\pi$). (1) is the current output of the PIP which corresponds to the current video sub-screen image. (2) is the requested data output or sub-screen image. (3) is an output signal activated when the tuner selects a channel. (4) represents an auto fine tuning (AFT) function completed after the channel is initially tuned. (5) represents the output of new data from the PIP replacing the prior image. It is assumed that the channels K to N are stored in the skip memory.

Figure 6E:
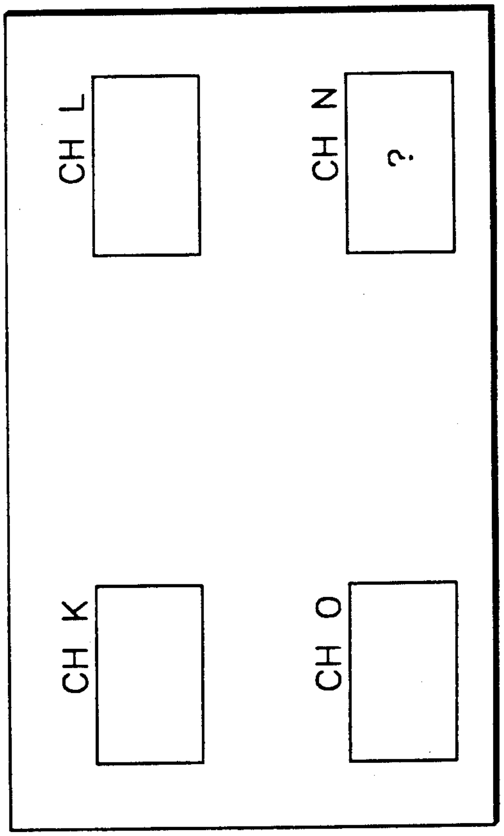

If there is no synchronized signal found in the multichannel mode, the channel becomes an ineffective channel as shown in FIG. 6 (B):

In FIG. 6-(B), 1' to 3' execute the same function as 1 to 3 of FIG. 6(A). 4' is an output signal transmitted when no synchronized signal is found for the channel. 5' is an output signal jumping to a corresponding channel. 6' is an output signal for repeating the processes of 1' to 5' until the channel position having a synchronized signal is found, and 7' executes the process of FIG. 6-(A) when a synchronized signal is found.

Thus, the channels stored in the skip-memory become active as shown in FIG. 6(C), where it is assumed that a NON-ADDED channel exists in position 3 and an ineffective channel is in position 4.

The NON-ADDED channel for a particular position, as shown, is defined as a channel not stored in the skip memory position.

The screen displayed by the operation of FIG. 6(B) represents the display of channels K, L, N and O, as shown in FIG. 6-(D), where channel M, which does not have a synchronization signal, is skipped.

Figure 7A:
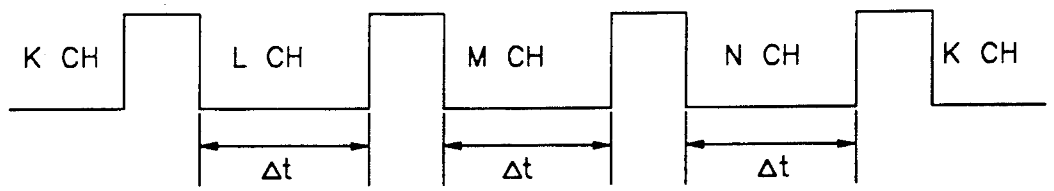
FIG. 7(A) is a multi-channel strobing time chart.
Figure 7B:
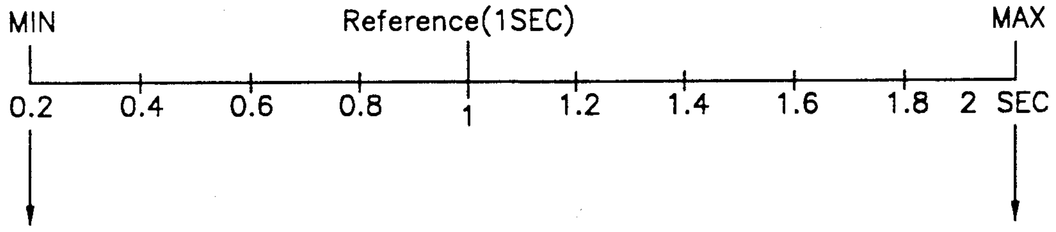
FIG. 7(B) is a reference time variation chart.

FIG. 7 shows the waveform strobing time of multi-channel page up/page down operation. FIG. 7-(A) indicates the time (t) between successive channel selections.

FIG. 7-(B) shows the process of making the strobing time 0.2 second per step when the reference time of the changed time (Δt) is 1 second.

Figure 8A:
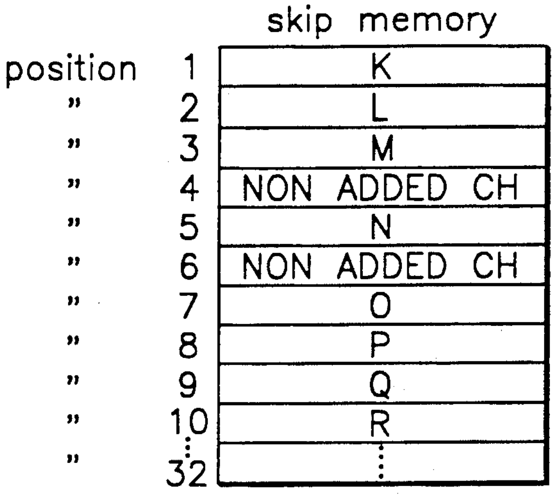
FIGS. 8-(A), (B), (C) and (D) are strobing charts of screens depicting the relationship of channel memory location to sub-screen location.
Figure 8B:
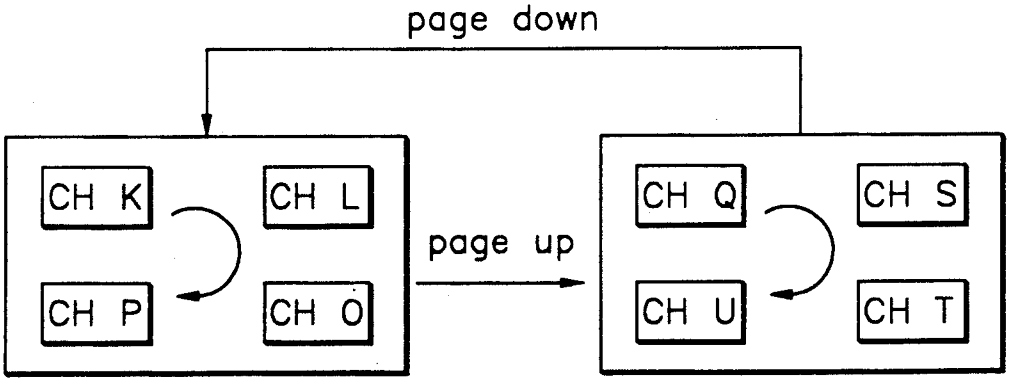
Figure 8C:
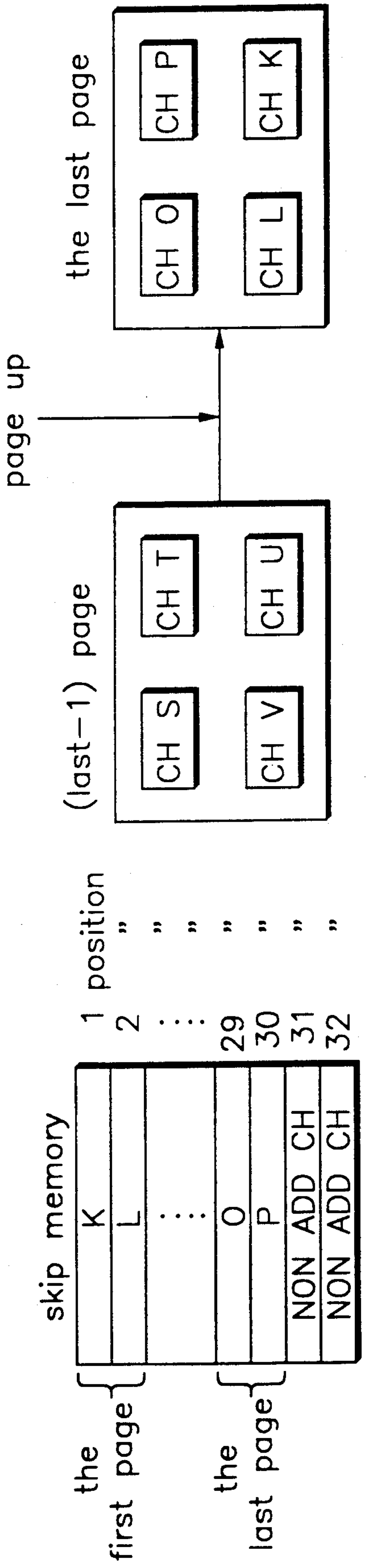

FIG. 8-(A) shows a skip memory consisting of 32 positions. FIG. 8-(B) shows one page of a TV screen on which four channels corresponding to four positions of the skip memory are displayed when the multi-channel feature is on.

It is possible to have P pages in the skip memory. If each page is defined to display 4 positions then 4P channel positions are available overall.

It was assumed in FIG. 8-(A) that position 4 and position 6 are non-added channels, and position 3 and position 10 are ineffective channels (having no synchronized signal). In the case of FIG. 8(B), each of four channels corresponding to four positions of the skip memory is displayed on one page of one TV screen, and it is possible to change the display by use of a page up or page down command.

The arrow of FIG. 8-(B) indicates the direction of the progress of strobing according to each channel.

FIG. 8-(C) shows the progress of the page up/down display. FIG. 8(D) indicates channels added to the skip memory.

If there are channels which do not have synchronous signals, the channel selector skips the channels. Thus, multi-channel mode is realized through the selection of positions having synchronous signals. As an example, if position 3 is an ineffective channel not having a synchronous signal, the channel is skipped over and an effective channel becomes active.

FIG. 9 shows that multiple channels are displayed on a single screen.

FIG. 9-(A-1) shows that a main screen is a playback screen (PB screen) and the sub-screens are multi-channel screens when tuner 1 is in play back mode.

FIG. 9-(B-1) shows that the main screen is a playback (PB) screen and the sub-screens are multi-channel screens when tuner 2 is in a playback mode.

FIG. 9-(B-2) shows that, when there is a synchronizing signal in a main screen but the screen is not in the playback mode, the main screen displays tuner 1 or a single line and the sub-screen displays tuner 2.

Figure 10A:
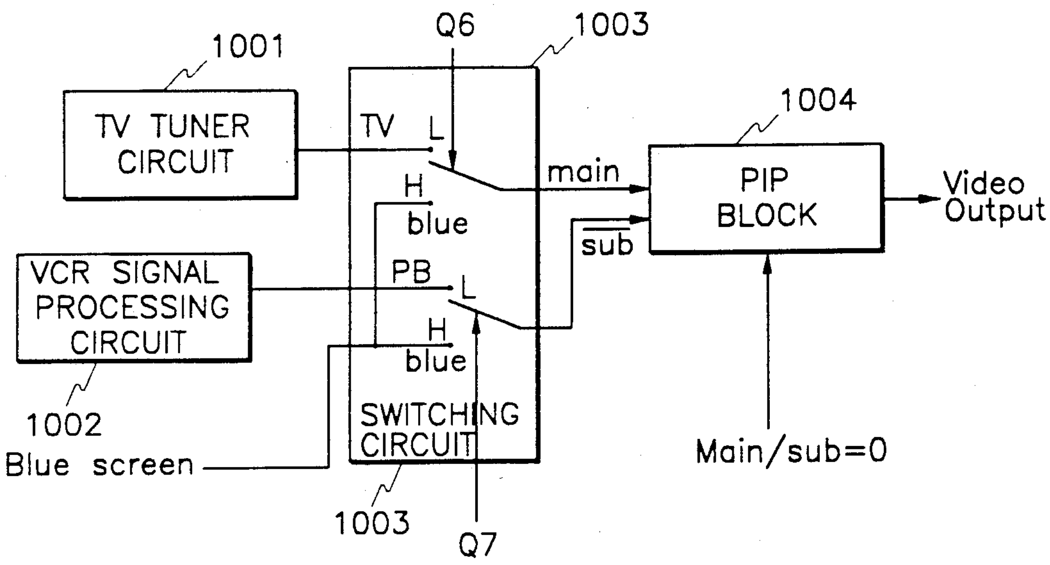
FIGS. 10(A), (A-1), (B) and (B-1) are hardware block diagrams of tuner 1 and tuner 2, respectively.
Figure 10B:
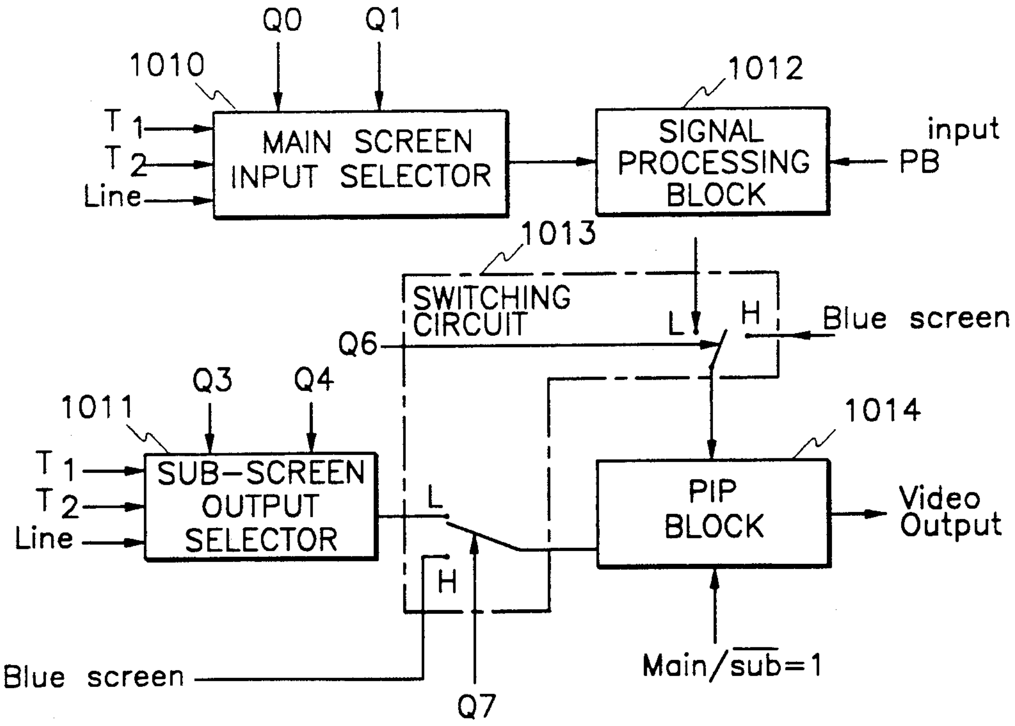
Figures 10, 11:
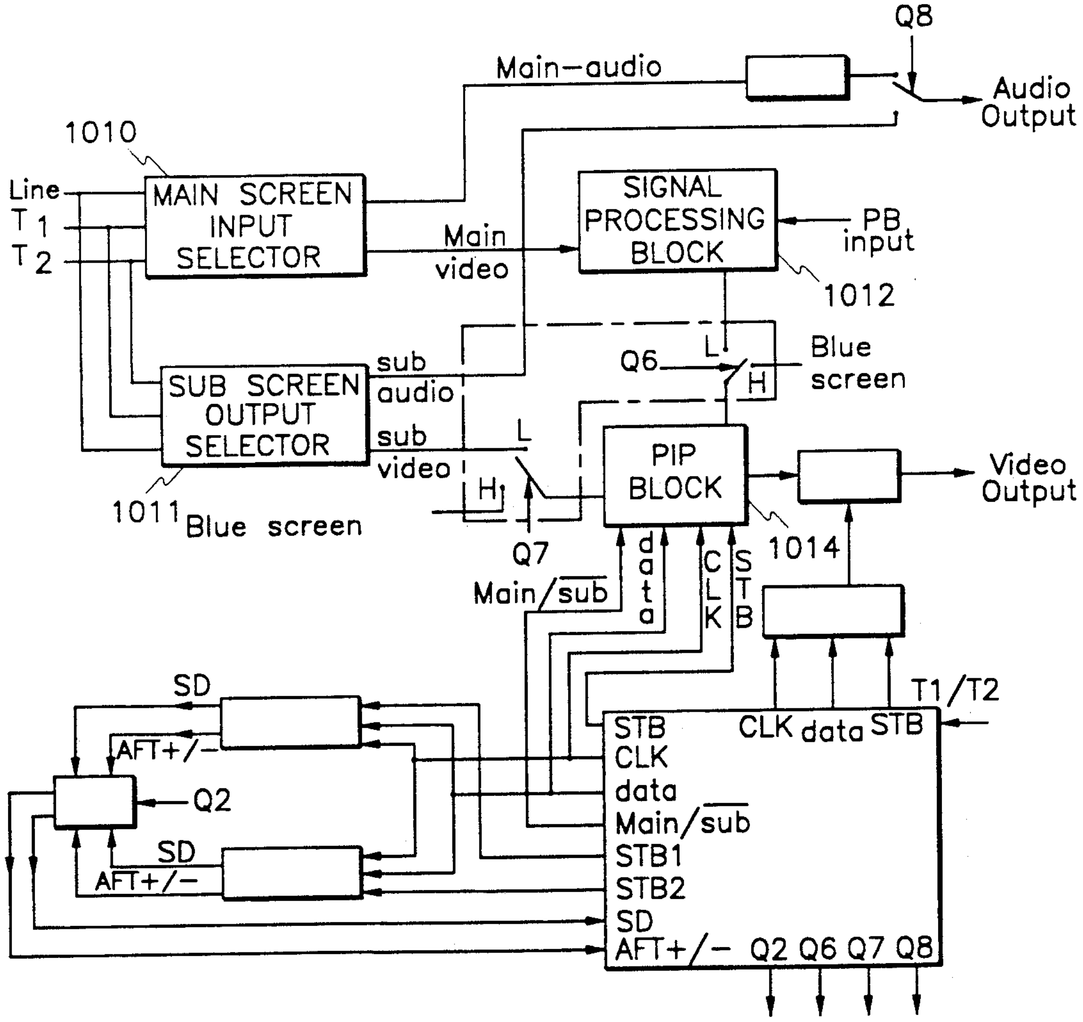
FIG. 11 is the total hardware block diagram for the multi-channel operation of this invention.

FIG. 10(A) is the tuner 1 system and FIG. 10-(B) is the tuner 2 system.

The tuner 1 system comprises a TV tuner circuit (1001), a VCR signal processing circuit (1002), a switching circuit (1003) which selects blue-screen signal whose channel does not receive any broadcasting signal and is controlled by control signals for the main screen (Q6) and the sub-screen (Q7), and PIP block (1004) for controlling the PIP.

The tuner 2 system comprises a main screen input selector (1010), sub-screen output selector (1011), signal processing block (1012) for the VCR, switching circuit (1013) which selects blue screen and is controlled by control signals for the main screen (Q7) and the sub-screen (Q7), and PIP block (1014) for processing then in PIP mode.

FIGS. 10-(A-1) and 10(B-1) describe the operation of the tuner 1 and tuner 2 systems. "X" denotes a NORMAL state which has a synchronous signal and "Y" indicates an ineffective channel (having no synchronous signal).

In the example of FIG. 10-(B-1), Q6 becomes L (low) and selects the playback (PB) screen as the main screen (during playback mode).

Q7 sets "X" to L if a synchronous signal is detected and selects the received channel as a sub-screen. If no synchronous signal is detected, then Q7 sets "Y" to (high) and selects blue-screen as a sub-screen.

Next, in the non-playback mode, Q6 and Q7 select either the received channel or blue screen as main screen or sub-screen according to whether a synchronous signal is found for the channel.

FIG. 11 shows a complete system composed of tuners 1 and 2 of FIG. 10, and a microcomputer as a controller.

Figure 12A:
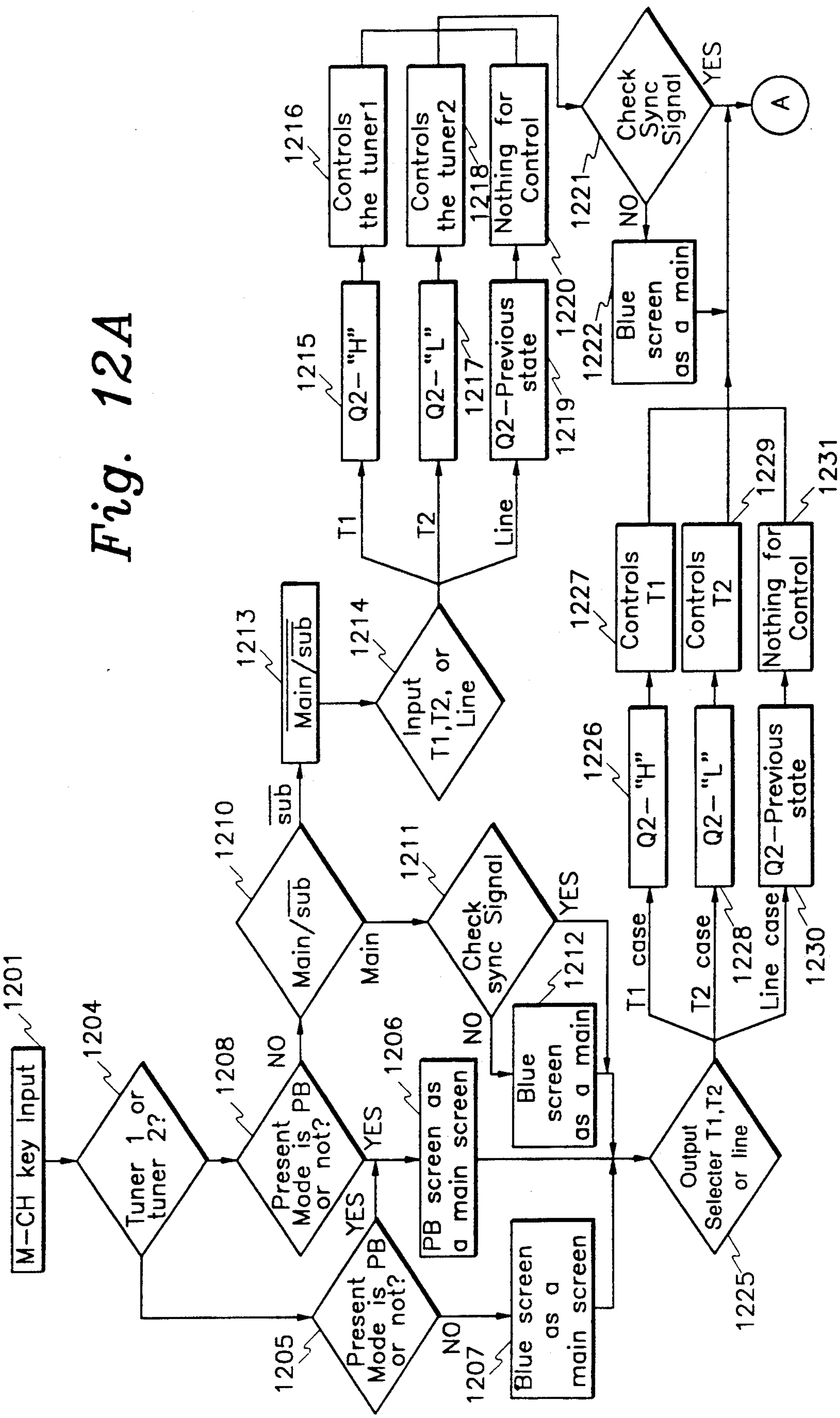
FIGS. 12A and 12B is a flow chart for the multichannel operation of this invention.
Figure 12B:
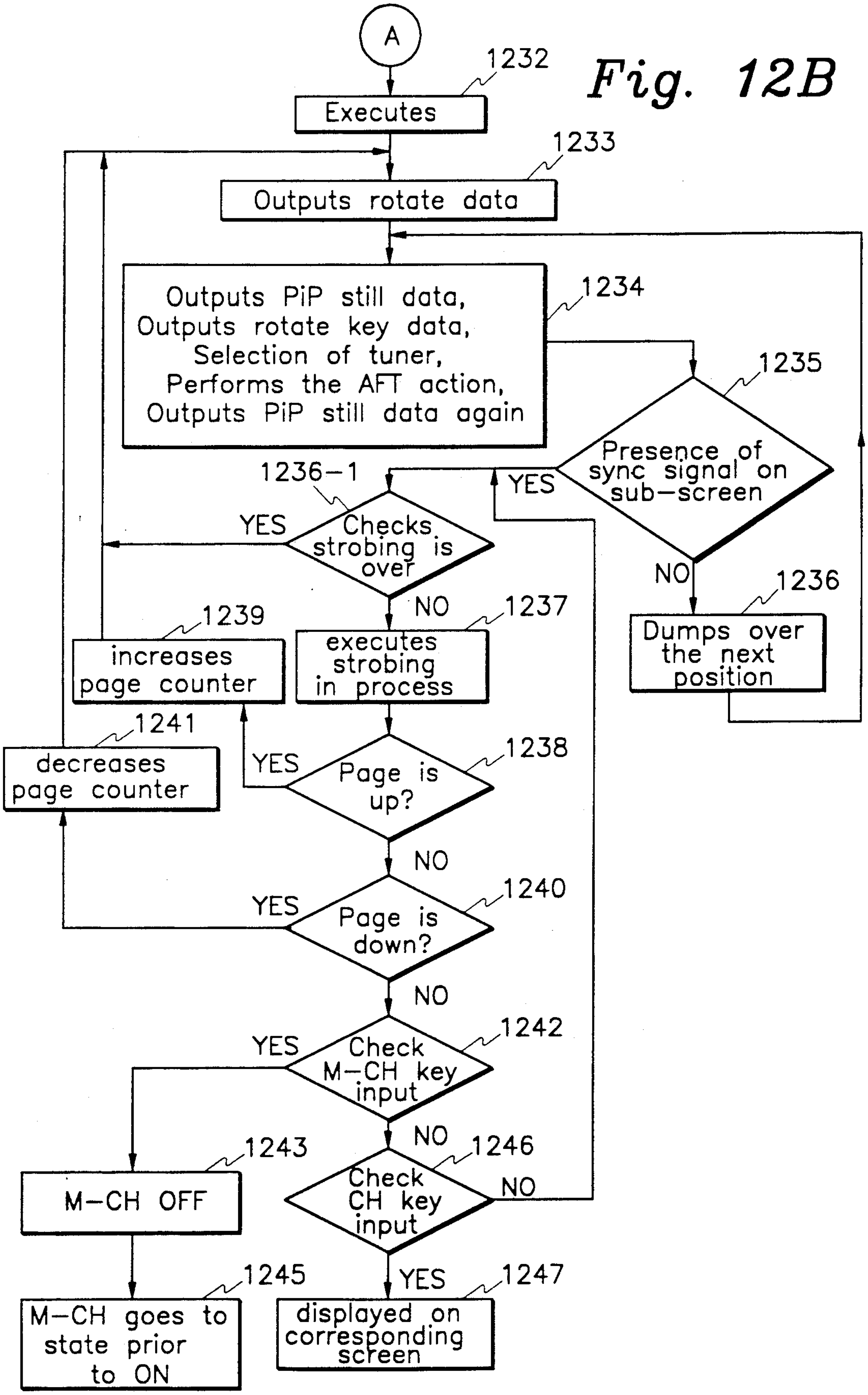

FIG. 12 is a flow chart for the system of FIG. 11.

If microcomputer (1100) receives a channel input (step 1201), it makes a decision whether the channel is the tuner 1 system or tuner 2 system (step 1204). If the channel is tuner 1, it will determine whether the channel is in playback mode or not (step 1205).

If it is not in playback mode, it selects the blue screen as a main screen (1207). If the tuner system is tuner 2, it will determine whether the present mode is playback mode or not (step 1208). If it is in playback mode, it selects the playback screen as the main screen (step 1206). If it is not in playback mode, it will determine whether it is a main screen or a sub-screen (step 1210).

If it is a main screen, it will check the existence of a synchronous signal (step 1211). If no synchronous signal is detected, it selects the blue screen as the main screen (step 1212). If the signal is a sub-screen (step 1210), it reverses the mode of main/sub again (step 1213) and selects a main screen according to the kind of input: tuner 1, tuner 2 or LINE (step 1214).

If the input is tuner 1, the controller sets Q2 to H (step 1215) and controls the tuner 1 (step 1216).

If the input is tuner 2, the controller sets Q2 to low (step 1217) and controls tuner 2 (step 1218).

If the input is LINE, the controller keeps the previous state of Q2 (step 719) and does nothing for control (step 1220).

When a main screen is selected according to the above process, the controller selects the blue screen as a main screen (step 1222) according to the existence of a synchronous signal (step 1221).

In contrast, the selection of a sub-screen is determined according to whether the output selector is tuner 1, tuner 2 or LINE (step 1225).

If the output selector is tuner 1, the controller sets the signal Q2 to high (step 1226), and controls tuner 1 (step 1227). If it is tuner 2, the controller sets the signal Q2 low (step 1228), and controls tuner 2 (step 1229).

If it is LINE, the controller keeps the previous state of Q2 (step 1230) and does nothing for control (step 1231).

Selection of the sub-screen is completed according to the above process. The microcomputer executes the multi-channel screen according to screen 1, 2 or n (step 1232), outputs both the current PIP data and the ROTATE key data (step 1233), begins the selection of a tuner, performs the AFT action, and then outputs the PIP data again (step 1234).

The microcomputer makes a decision based on the presence of a synchronous signal for the sub-screen (step 1235).

If there is no synchronous signal, the controller jumps over to the next position (step 1236). If there is a synchronous signal, the strobing is completed (step 1236-1). The controller executes the strobing in progress (step 1237), increases the content of the page counter (step 1239) when the page up command is issued (step 1238), decreases the content of the page counter (step 1241) when the page down command is issued (step 1240), and makes a decision as to the existence of multi-channel key input (step 1242) inputted again. If there is input, the multi-channel function ceases (step 1243), and the multi-channel function reverts to the state it was in prior to activation (step 1245).

If there is no multi-channel key input (step 1246), a corresponding channel is displayed on the corresponding screen (step 1247).

Thus, a television screen is converted to a multi-channel display by using an existing PIP or multiscreen function, with the effect of improving the convenience and reliability of channel selection so that a user may easily select channels through a menu-based selection.

Figure 1:
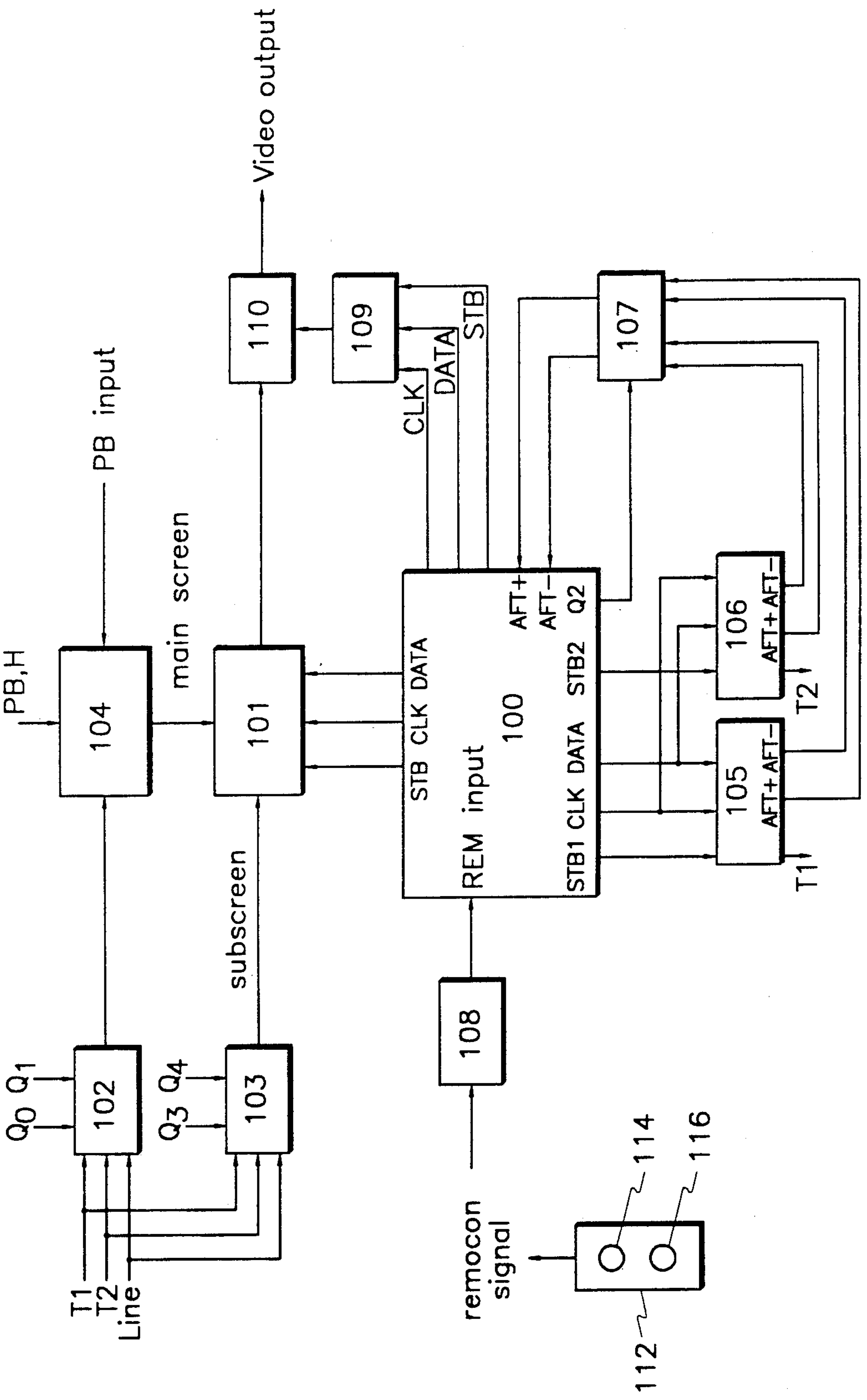
FIG. 1 is a hardware block diagram for the operation of the selector of the invention.

In FIG. 1, input selector 102 controlled by microcomputer 100, controls the main screen of a television. The input selector operates as a multiplexer for selecting one of three signals, (T1), (T2) and line, by control signals Q0 and Q1.

Output selector 103 controls the sub-screens. The output selector also operates as a multiplexer for selecting one of the three signals, T1, T2 and line, by the control signals Q3 and Q4.

A processing circuit 104 generates a final main screen as a function of both PB, the playback signal from the VCR, and the output signal from the input selector 102. If there is no playback signal PB from the VCR, the processing circuit 104 selects the main screen as determined by input selector 102. If there is a playback signal on line PB from the VCR, the processing circuit 104 selects this signal as the main screen.

PIP circuit 101 receives the output signal from the signal processing circuit 104 and the output signal from output selector 103 and transmits a PIP video signal composed of main screen and sub-screen data through mixer 110 under the control of microcomputer 100.

Microcomputer 100 also controls tuner 1 (105) and tuner 2 (106) by decoding the output signal of preamplifier 108 which receives a signal from a remote control 112. The remote control 112 includes a rotate 114 and an add key 166, along with conventional keys. Tuners 105 and 106 are used for displaying multiple channels on a single screen, as described above in connection with the '573 application. If the signal of microcomputer terminal STB 1 microcomputer is high, tuner 1 becomes active. If the signal of microcomputer terminal STB2 is high, then tuner 2 becomes active. If a multi-channel up/down command is generated for a sub-screen, the signal of terminal STB1 goes high and the signal of terminal STB2 goes low. If a multi-channel up/down command is generated for both the main screen and a sub-screen, both terminals STB1 and STB2 become high.

When a multi-channel up/down command is generated, channel selection data is outputted from microcomputer 100 and controlled by the signals STB1 and STB2, as shown in FIG. 2.

A multiplexer 107 receives the output signals from tuners 105 and 106, and a control signal Q2 from microcomputer 100. Multiplexer 107 feeds its outputs back to microcomputer 100 to control the auto fine tuning of the selected tuner. The selection between tuner 105 and tuner 106 for the auto fine tuning is controlled by control signal Q2.

An OSD (On Screen Display) circuit 109 is controlled by micro-computer 100. Circuit 109 outputs data to mixer 110 in order to display characters on the screen in a known manner. The signals of the main screen and the sub-screen transmitted from PIP circuit 101, and the character signal of OSD (On Screen Display) circuit 109 are superimposed by mixer 100. The superimposed signal is outputted to the video display by mixer 110.

When serial data is outputted from the microcomputer 100, as shown in FIG. 3, the ROTATE and STROBE functions of PIP circuit 101 are executed. Where the present invention is used to control 4 sub-screens, if the rotate key 114 is actuated during strobing of each screen, the strobing pauses and then strobe data is outputted from the strobing terminal STB of microcomputer 100.

FIG. 4-A shows the 4 strobed sub-screens on a main screen in a multi-channel state. In this state, the interchanging procedure between channel 3 (CH 03) and channel 9 (CH 09) is as follows: The strobe is changed to still state by actuation of the rotate key 114 on a remote control 112. In this invention, the strobing state means that 4 sub-screens are rotating and the still strobe state means that 3 sub-screens among 4 sub-screens are still screens, and the remaining one is a moving screen. That is, three screens are non-changable and the fourth screen is selectable by the remote control, as described below.

Figure 4A:
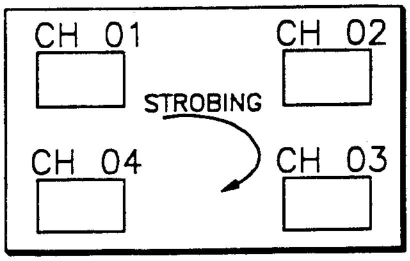
FIGS. 4A, 4B, 4C, and 4D are is diagrams showing the strobing operation of multichannel mode.
Figure 4B:
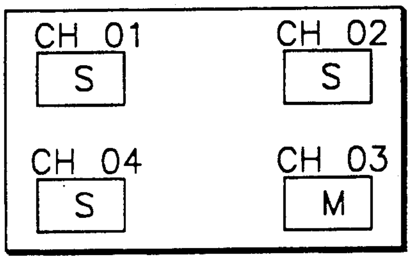
Figure 4C:
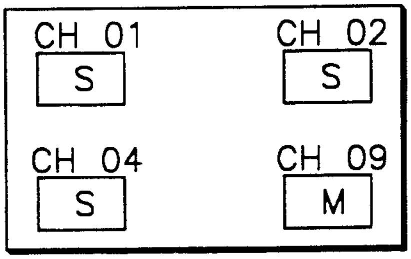
Figure 4D:
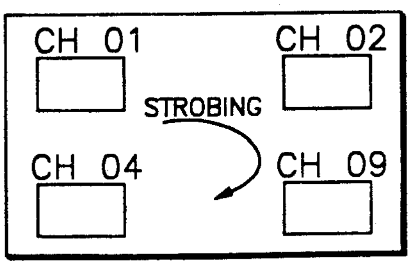
Figure 5:
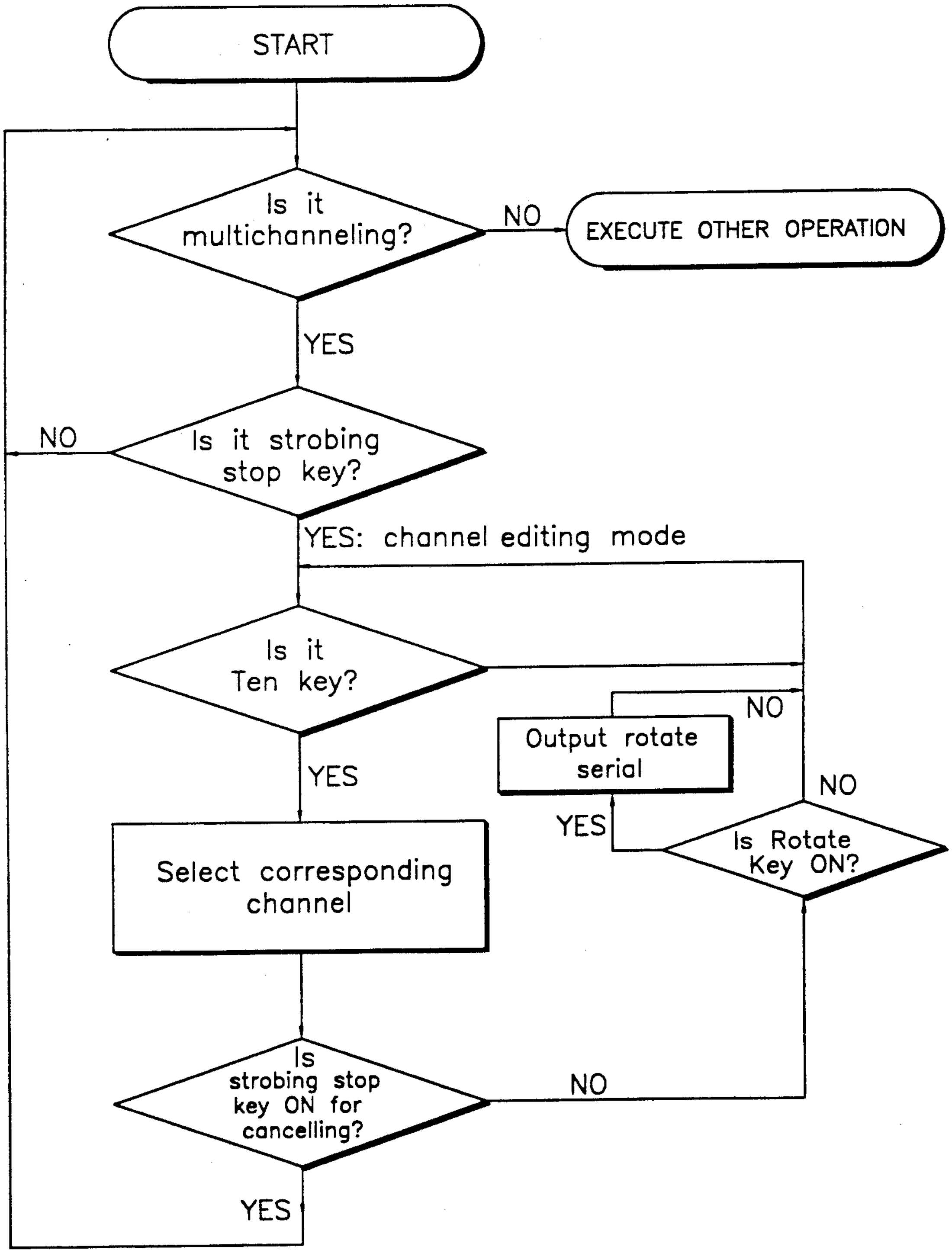
FIG. 5 is a flow chart showing the selector of the present invention.

Channels 01, 02 and 04 in FIG. 4B are still screens and channel 03 is a moving screen.

Under this condition, if the TEN KEY 0 (the "0" key of the numeric key pad) of the remote control is actuated, the moving screen, channel 03, is changed to channel 09 (FIG. 4-C). After that, if the strobe still is cancelled by the strobe key, 4 PIP channels become strobing.

If the add key 116 of the remote control is actuated before the strobe still is cancelled, skip memory is updated again.

Thus, according to this invention, a user can select the programs on the TV by using both the add function of skip memory and the select function of multi-channel operation.

What is claimed is:

1. A microcomputer controlled multi-channel picture-in-picture television display system, for controlling the selection of channels for display within a plurality of sub-screens and a display screen, comprising:
   - first means for selecting a mode of multi-channel operation to display channels from a skip memory of the microcomputer in the sub-screens by actuating a rotate key of a remote control device to transmit said selected mode to the microcomputer;
   - second means for selecting still screens and moving screens of the sub-screens and the display screen;

third means for updating said skip memory using an add key of said remote control device to define the channels to be viewed next in the sub-screens; and fourth means for controlling a strobe signal of the microcomputer to generate a channel up/down command for a sub-screen during multi-channel operation.

2. A microcomputer controlled multi-channel picture-in-picture television display method for controlling the selection of channels for display within a plurality of sub-screens and a display screen, comprising the steps of:

selecting a mode of multi-channel operation to display channels from a skip memory of the microcomputer in the sub-screens by actuating a rotate key of a remote control device to transmit said selected mode to the microcomputer;

selecting still screens and moving screens of the sub-screens and the display screen;

updating said skip memory using an add key of said remote control to define the channels to be viewed next in the sub-screens; and controlling a strobe signal of the microcomputer to generate a channel up/down command for a sub-screen during multi-channel operation.

3. The method according to claim 2, further comprising the steps of:

cancelling strobing upon further actuation of the rotate key; and activating strobing upon output of serial data from the microcomputer.

* * * * *